United States Patent [19]

Usami

[11] Patent Number: 5,434,645
[45] Date of Patent: Jul. 18, 1995

[54] COLOR IMAGE PROCESSING APPARATUS

[75] Inventor: Akihiro Usami, Tokyo, Japan

[73] Assignee: Canon Kabushiki Kaisha, Tokyo, Japan

[21] Appl. No.: 115,799

[22] Filed: Sep. 3, 1993

Related U.S. Application Data

[63] Continuation of Ser. No. 684,146, Apr. 11, 1991, abandoned, which is a continuation of Ser. No. 391,664, Aug. 8, 1989, abandoned, which is a continuation of Ser. No. 38,238, Apr. 14, 1987, abandoned.

[30] Foreign Application Priority Data

Apr. 16, 1986 [JP] Japan .................. 61-86139

[51] Int. Cl.⁶ .............. G03F 3/08; G03B 27/80; H04N 1/46
[52] U.S. Cl. ............... 355/38; 358/520; 358/530; 347/118
[58] Field of Search .......... 355/200, 202, 326, 32, 355/38; 346/157; 358/516, 520, 521, 523, 530

[56] References Cited

U.S. PATENT DOCUMENTS

| | | | |
|---|---|---|---|
| 3,622,698 | 11/1971 | Richeson et al. | 178/6 |
| 4,032,969 | 6/1977 | Ueda | 355/80 |
| 4,060,829 | 11/1977 | Sakamoto | 358/523 |
| 4,285,009 | 8/1981 | Klopsch | 358/76 |
| 4,349,835 | 9/1982 | Horiguchi et al. | 358/76 |
| 4,364,084 | 12/1982 | Akimoto et al. | 358/76 |
| 4,383,277 | 5/1983 | Kubo | 358/258 |
| 4,572,657 | 2/1986 | Amano et al. | 355/38 |
| 4,622,582 | 11/1986 | Yamada | 358/80 |
| 4,626,903 | 12/1986 | Giesche et al. | 358/521 |
| 4,663,662 | 5/1987 | Sekizawa et al. | 358/530 |
| 4,679,074 | 7/1987 | Sugiura et al. | 358/80 |
| 4,707,118 | 11/1987 | Terashita | 355/38 |
| 4,734,762 | 3/1988 | Aoki et al. | 358/516 |
| 4,782,390 | 11/1988 | Hayashi et al. | 358/506 |
| 4,819,193 | 4/1989 | Imao | 358/521 X |
| 4,845,550 | 7/1989 | Urabe et al. | 358/520 |

FOREIGN PATENT DOCUMENTS 0084228 7/1983 European Pat. Off.
2073987 10/1981 United Kingdom.

OTHER PUBLICATIONS

Dillenburger, W.: Einfuhrung in die Fernsehtechnik, vol. 2, Berlin, Schiele und Schon, 1969, p. 25–30.

Primary Examiner—Fred L. Braun
Attorney, Agent, or Firm—Fitzpatrick, Cella, Harper & Scinto

[57] ABSTRACT

A color image processing apparatus includes a plurality of image reading units, each of which reads an original image and produces a color image signal; a color image recording unit which records a color image in accordance with the color image signal; and a correction unit provided for each of the plurality of image reading units to correct the color image signal such that each image reading unit has the same overall spectral sensitivity characteristics.

33 Claims, 2 Drawing Sheets

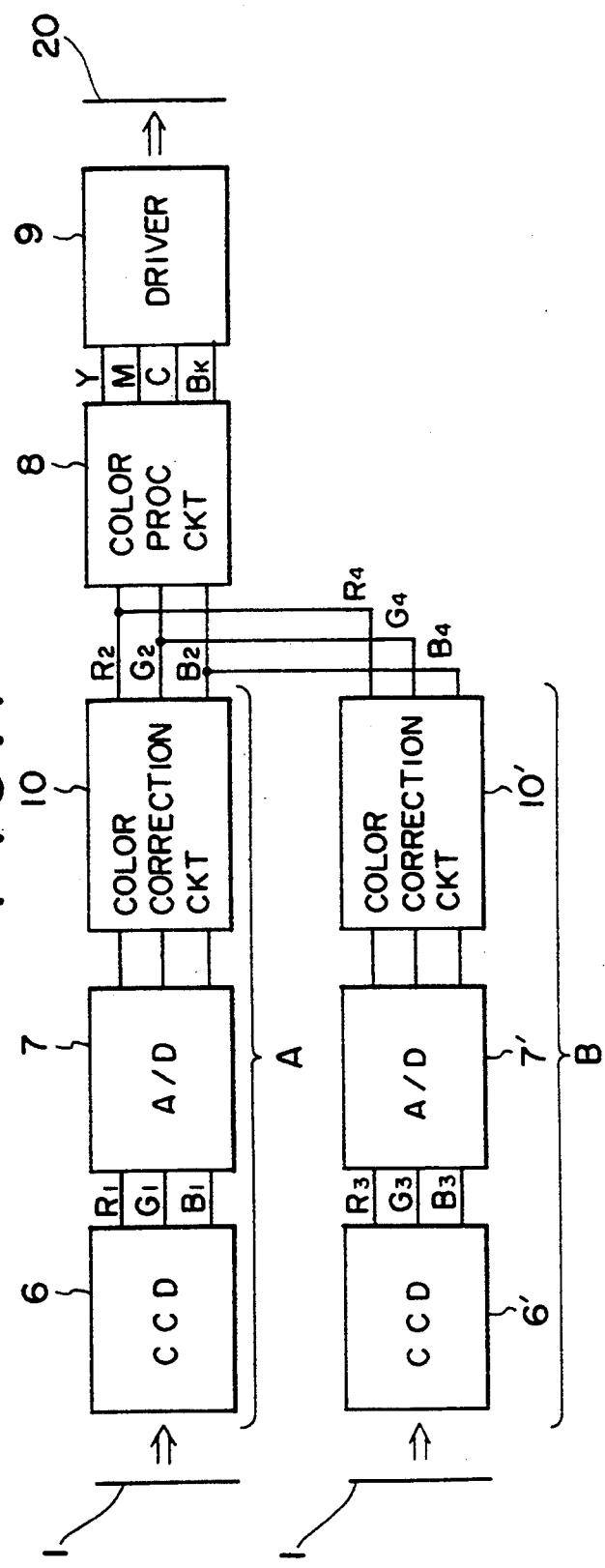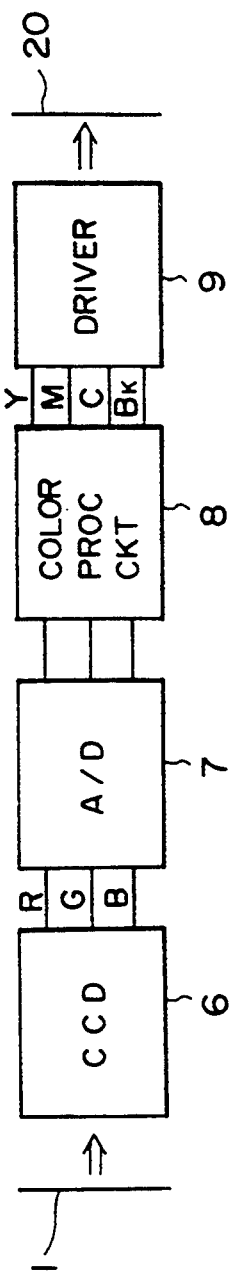

COLOR IMAGE PROCESSING APPARATUS

This application is a continuation of application Ser. No. 07/684,146 filed Apr. 11, 1991, now abandoned, which in turn is a continuation of application Ser. No. 07/391,664 filed Aug. 8, 1989, now abandoned, which in turn is a continuation of application Ser. No. 07/038,238 filed Apr. 14, 1987, now abandoned.

BACKGROUND OF THE INVENTION

1. Field of the Invention

The present invention relates to a color image processing apparatus for processing a color image signal, such as a copying machine.

1. Related Background Art

A color processing system in a conventional color copying machine is constructed as shown in FIG. 2. Particularly, an image of a color original 1 is opto-electrically converted into an electrical signal by a color charge coupled device (CCD) 6. An analog/digital (A/D) converter 7 converts red (R), green (G) and blue (B) color analog signals from the CCD 6 into digital signals. A color processing circuit 8 forms yellow (Y), magenta (M), cyan (C) and black (Bk) color signals based on the output signals of the A/D converter 7. A driver 9 is used for recording a reproduced color image, for example, on a recording paper, in accordance with the signals from the color processing circuit 8.

A printer is constructed, for example, as shown in FIG. 6. In FIG. 6, a rotary polygon mirror 11 reflects (scans), for example, a laser beam corresponding to a color image signal (Y, M, C and Bk). A light reflected by the polygon mirror 11 is reflected by a mirror 12 to be applied to a photosensitive drum 14 which is developed with each color (Y, M, C and Bk) toner by a rotary developer 13. Each color toner on the drum 14 is transferred on a transfer sheet 16 wound about a transfer drum 15 and thereafter, the toner is fixed on the transfer sheet 16 by a fixing roller 17.

Such a color processing system of a color copying machine is broadly divided into a reader including the CCD 6 and the A/D converter 7 and a printer including the color processing circuit 8 and the driver 9.

A single color processing circuit is used in such a color copying machine to effect color correction at the reader and the printer.

There arises a problem, however, if a plurality of readers are intended to be used for a single printer. As shown in FIG. 3, a reader is constructed of an original support glass 2 on which an original 1 is placed, a lighting system 3, a focusing element array 4 for reading the original 1 and producing the image, an infrared cut filter 5, and a CCD 6 for converting a light from the focusing element array 4 via the filter 5 into an electrical signal. In such a construction, there are many scatterings in manufacture, such as of a color temperature of a lamp constituting the lighting system 3, of a spectral transmission factor of the focusing element array 4, of a spectral transmission factor of the infrared cut filter 5, and of a spectral transmission factor of each R, G or B filter of the contact type color CCD 6. These scatterings determine an overall spectral sensitivity characteristics of each reader. As a result, if a plurality of readers are used in reading the same color image original, each reader may output a different value so that if the printer uses the output value as it is, a different color copy may be obtained.

SUMMARY OF THE INVENTION

It is an object of the present invention to provide a color image processing apparatus eliminating the above disadvantage.

It is another object of the present invention to provide a color image processing apparatus capable of obtaining the same color reproducing characteristics of each reader in case a plurality of readers and a single printer are used respectively for reading an image and printing a color signal.

It is an object of the present invention to provide a color image processing apparatus which comprises a plurality of image reading means each for reading an original image and producing a color image signal, single color image recording means for recording a color image in accordance with the color image signal and correction means provided for each of the plurality of image reading means for correcting the color image signal such that each image reading means has the same overall spectral sensitivity characteristics.

The other objects of the present invention will become apparent from the following detailed description taken in connection with the accompanying drawings.

FIG. 1 is a block diagram showing an embodiment of the color image processing apparatus according to the present invention;

FIG. 2 is a block diagram showing a conventional color processing system;

DETAILED DESCRIPTION OF THE PREFERRED EMBODIMENTS

Figure 3:
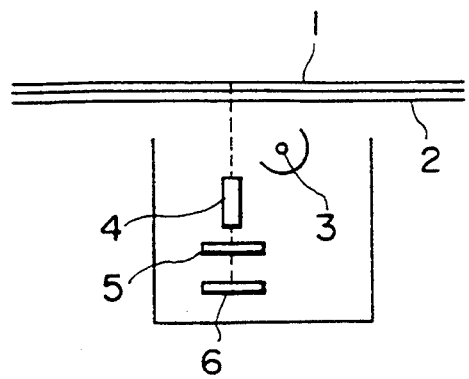
FIG. 3 shows the construction of a reader.
Figure 4:
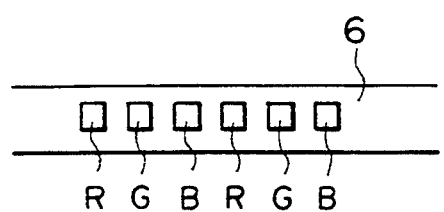
FIG. 4 is a schematic diagram showing a contact type color CCD.

FIG. 1 is a block diagram showing an embodiment of the color image processing apparatus according to the present invention, wherein two readers are connected to a single printer.

Referring to FIG. 1, readers A and B are constructed of CCD's 6 and 6', A/D converters 7 and 7' and color correction circuits 10 and 10', respectively.

The CCD's 6 and 6' read a color original 1 and convert the color image into an electrical signal. The R, G and B output signals ($R_1$, $G_1$, $B_1$, $R_3$, $G_3$ and $B_3$) are A/D converted by the A/D converters 7 and 7' and input to the color correction circuit 10 and 10'.

The output signals ($R_2$, $G_2$, $B_2$, $R_4$, $G_4$ and $B_4$) from the two color correction circuits 10 and 10' are converted by a color processing circuit 8 into Y, M, C and Bk color signals and input to a driver 9 to record them on a recording paper 20 and obtain color images.

The color correction circuits 10 and 10' are used for correcting the overall spectral sensitivity characteristics of the readers, the readers each having CPU, RAM and ROM and correcting R, G, and B color digital signal values from the A.D converters 7 and 7'.

Figure 5:
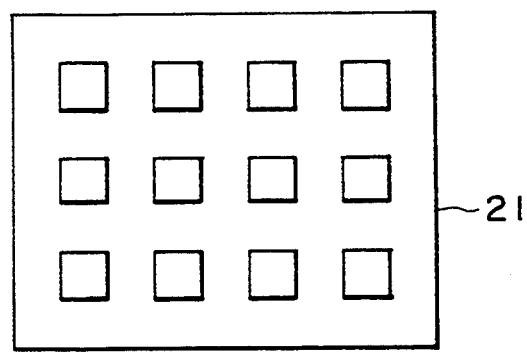
FIG. 5 shows an example of a color mixture patch.
Figure 6:
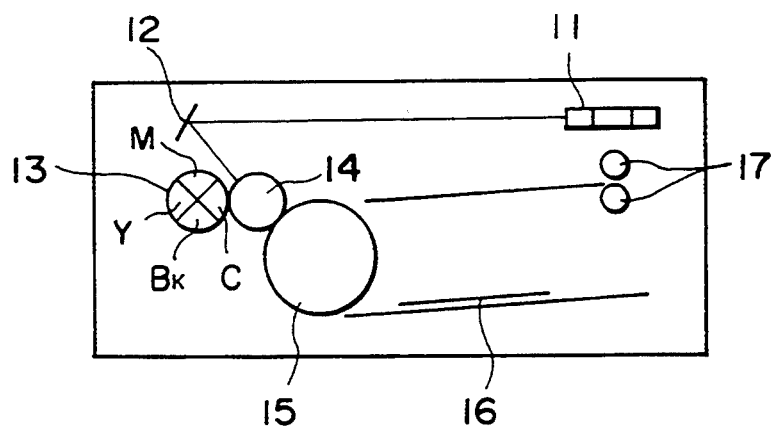
FIG. 6 shows the construction of a printer.

Particularly, each reader A or B reads a color mixture patch 21 shown in FIG. 5 instead of the original 1. Then, correction coefficients of the color correction circuits 10 and 10' are determined such that the output signals ($R_2$, $G_2$ and $B_2$) of the reader A become equal to the output signals ($R_4$, $G_4$ and $B_4$) of the reader B.

First, assume that the color correction coefficients of the reader A, are simplified as:

$$R_{2i}=R_i, G_{2i}=G_i, B_{2i}=B_i$$

where i is the color patch number.

Next, assume that the outputs ($R_4$, $G_4$ and $B_4$) of the reader B are given by:

$$\begin{bmatrix} R_{4i} \\ G_{4i} \\ B_{4i} \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R_{3i} \\ G_{3i} \\ B_{3i} \end{bmatrix}$$

The coefficients $a_{ij}$ (i, j are 1 to 3) are determined using the least square method such that each difference between $R_{2i}$ and $R_{4i}$, between $G_{2i}$ and $G_{4i}$, and between $B_{2i}$ and $B_{4i}$ becomes smallest. An example of determining the coefficients is given below taking R as an example:

$$\phi_R = \sum_i (R_{4i} - R_{2i})^2 = \sum_i (a_{11} R_{3i} + a_{12} G_{3i} + a_{13} B_{3i} - R_{2i})^2$$

The partial differential equation of $\phi_R$ relative to $a_{11}$, $a_{12}$ and $a_{13}$ yield:

$$\frac{\partial \phi R}{\partial a_{11}} = 0, \quad \frac{\partial \phi R}{\partial a_{12}} = 0, \quad \frac{\partial \phi R}{\partial a_{13}} = 0,$$

The above simultaneous equations are solved to determine $a_{11}$, $a_{12}$ and $a_{13}$. A similar calculation is conducted for G and B to thereby obtain all the coefficients $a_{ij}$ (i, j=1 to 3). The obtained coefficients $a_{ij}$ are stored in the ROM of the color correction circuit 10' of the reader B. The color correction circuit 10' corrects the input signals ($R_3$, $G_3$ and $B_3$) in accordance with the coefficients.

As a result, a difference between the output signals ($R_2$, $G_2$ and $B_2$) of the color correction circuit 10 of the reader A and the output signals ($R_4$, $G_4$ and $B_4$) of the color correction circuit 10' of the reader B, respectively for a same color original, can be made as small as possible, thus obtaining substantially the same color image on the recording paper 20.

Signals to be color-corrected may be Y, M and C signals instead of R, G and B signals, or may be Y, M and C signals after density conversion (logarithmic conversion or the like).

Further, the color processing circuit 8 of the printer may be assembled in the reader to be combined with the color correction circuits 10 and 10'.

As described so far, a plurality of color image reading means can be connected to a single color image recording means while retaining the same overall spectral sensitivity characteristics.

The present invention is not limited only to the above embodiment, but various applications and modifications are possible within the scope of the appended claims.

What is claimed is:

1. A color image processing system comprising:
   a plurality of independent image reading units each for reading a respective original to produce color component signals, wherein each of said independent image reading units comprises:
   an independent lighting system;
   an image reading sensor for reading the respective original, wherein overall spectral sensitivity characteristics of said lighting system and said image reading sensor of each image reading unit may vary from those of each other image reading unit; and
   correction means for correcting the color component signals,
   wherein said correction means of at least one of said image reading units includes means for storing information regarding another of said image reading units and for correcting the color component signals based on the stored information regarding the other image reading unit so that the at least one image reading unit has substantially the same corrected overall spectral sensitivity characteristics as the other image reading unit; and
   a color image recording unit for selectively receiving corrected color component signals from one of said plurality of independent image reading units and for recording a color image in response to the corrected color component signals.

2. A color image processing system according to claim 1, wherein the characteristics of each said correction means are determined such that each of said image reading units can output a same output color image signal for a same reference color.

3. A color image processing system according to claim 1, wherein said color image recording unit includes an electro-photographic printer.

4. A color image processing system according to claim 1, wherein each of said image reading units comprises converting means for converting a given color image into the color component signals.

5. A color image processing system according to claim 4, wherein said converting means comprises:
   a color separation filter; and
   a sensor disposed adjacent to said color separation filter.

6. A color image processing system according to claim 5, wherein said color separation filter includes red, green and blue filters.

7. A color image processing system according to claim 5, wherein said converting means further comprises an infrared cut filter mounted on said sensor.

8. A color image processing system comprising:
   a plurality of independent image reading units each for reading a respective original to produce color component signals, wherein each of said independent image reading units comprises:
   an independent lighting system;
   an image reading sensor for reading the respective original, wherein overall spectral sensitivity characteristics of said lighting system and said image reading sensor of each image reading unit may vary from those of each other image reading unit; and
   correction means for correcting the color component signals such that each of said independent image reading units has substantially the same corrected overall spectral sensitivity characteristics, said correction means including a matrix calculation circuit; and
   a color image recording unit for selectively receiving corrected color component signals from one of said plurality of independent image reading units and for recording a color image in response to the corrected color component signals.

9. A color image processing system according to claim 3, wherein correction coefficients of said matrix calculation circuit are determined such that each of said image reading units can output a same output color image signal for a same reference color.

10. A color image processing system according to claim 9, wherein the correction coefficients are determined using a least square method.

11. An independent color image reading unit for a color image processing system including a plurality of independent image reading units for reading respective color originals and a color image recording unit, said independent color image reading unit comprising:
an independent lighting unit for illuminating a color original;
converting means for converting an image of a respective color original illuminated by said lighting unit into color component signals; and
correction means for correcting the color component signals, said correction means including means for storing information regarding another of the image reading units and for correcting the color component signals for the respective original based on the stored information regarding the other image reading unit so that said independent image reading unit has substantially the same corrected spectral sensitivity characteristics as the other image reading units.

12. A color image reading unit according to claim 11, wherein the characteristics of said correction means are determined such that each of said image reading units can output a same output color image signal for a same reference color.

13. A color image reading unit according to claim 11, wherein said correction means includes a matrix calculation circuit.

14. A color image reading unit according to claim 13, wherein correction coefficients of said matrix calculation circuit are determined such that each of said image reading units can output a same output color image signal for a same reference color.

15. A color image reading unit according to claim 14, wherein the correction coefficients are determined using a least square method.

16. A color image reading unit according to claim 11, wherein said converting means comprises:
a color separation filter; and
a sensor disposed adjacent to said color separation filter.

17. A color image reading unit according to claim 16, wherein said color separation filter includes red, green and blue filters.

18. A color image reading unit according to claim 16, wherein said converting means further comprises an infrared cut filter mounted on said sensor.

19. A color image processing system comprising:
a plurality of independent image reading units each for reading a respective original and producing corrected color component signals, each said independent image reading unit comprising:
an image reading sensor for producing analog color component signals corresponding to a respective original;
an analog-to-digital converter for converting the analog color component signals to digital color component signals;
color correction means for color correcting the digital color component signals,
wherein said color correction means of at least one of said image reading units includes means for storing information regarding another of said image reading units and for correcting the digital color component signals based on the stored information regarding the other image reading unit so that the at least one image reading unit has substantially the same corrected overall spectral sensitivity characteristics as the overall spectral sensitivity characteristics of the other image reading unit, and
means for outputting the corrected color component signals.

20. A color image processing system according to claim 19, wherein each said independent image reading unit further comprises an independent lighting system for illuminating the original image.

21. A color image processing system according to claim 19, wherein each said color correction means operates in parallel with the other said color correction means.

22. A color image processing system according to claim 19, further comprising a color image recording unit for recording a color image in response to the output corrected color component signals.

23. An image reading unit for a color image processing system comprising a plurality of independent image reading units for reading respective color originals, said image reading unit comprising:
an image reading sensor for producing analog color component signals corresponding to a respective original;
an analog-to-digital converter for converting the analog color component signals to digital color signals;
color correction means for color correcting the digital color component signals, said color correction means comprising means for storing information regarding another of the image reading units and for correcting the digital color component signals based on the stored information regarding the other image reading unit so that said image reading unit has substantially the same corrected overall spectral sensitivity characteristics as the corrected overall spectral sensitivity characteristics of the other image reading unit; and
means for outputting the corrected color component signals.

24. An image reading unit according to claim 23, further comprising a lighting system for illuminating the original image, said lighting system being independent of other lighting systems of the other said image reading units.

25. An image reading unit according to claim 23, wherein said color correction means operates in parallel with other color correction means of the other said image reading units.

26. An image reading unit according to claim 23, wherein said color image processing system comprises a color image recording unit for recording a color image in response to the output corrected color component signals.

27. A color image processing system, comprising:
a plurality of image reading sensors for producing color component signals corresponding to respective originals; and
a plurality of color signal processing channels, each said channel processing a color signal corresponding to a respective original from a respective image reading sensor and outputting a corrected color component signal, wherein said color signal processing channel corresponding to at least one of said image reading sensors comprises means for storing information regarding another of the image reading sensors and for correcting the color signal from the corresponding image reading sensor based on the stored information regarding the other image reading sensor so that the corrected color component signal has substantially the same corrected overall spectral sensitivity characteristics as the overall spectral sensitivity characteristics of the signals output from the color signal processing channel corresponding to the other image reading sensor, wherein each color signal processing channel operates in parallel with the other color signal processing channels.

28. A color image processing system according to claim 27, further comprising a plurality of independent lighting systems each for illuminating an original image, wherein one lighting system is associated with each image reading sensor.

29. A color image processing system according to claim 27, further comprising a color image recording unit for recording a color image in response to the output color corrected component signals.

30. An image reading unit for a color image processing system comprising a plurality of independent image reading units for reading respective color originals, said image reading unit comprising:

an image reading sensor for producing analog color component signals corresponding to a respective color original;

a color signal processing channel for processing a color signal from said image reading sensor corresponding to the respective original and outputting a corrected color component signal, said color signal processing channel comprising means for storing information regarding another image reading unit and for correcting the color signal based on the stored information regarding the other image reading unit so that the corrected color component signal has substantially the same overall spectral sensitivity characteristics as the overall spectral sensitivity characteristics of signals output from the other image reading unit, wherein said color signal processing channel operates in parallel with other color signal processing channels of the other image reading units.

31. An image reading unit according to claim 30, further comprising a lighting system for illuminating the original image, said lighting system being independent of other lighting systems of the other said image reading units.

32. An image reading unit according to claim 30, wherein said color image processing system comprises a color image recording unit for recording a color image in response to the output corrected color component signals.

33. A correction unit for an independent image reading unit which has an image reading sensor and an independent lighting source and which has overall spectral characteristics determined by the independent lighting source and by the image reading sensor, said correction unit being usable in a system having a plurality of such image reading units, said correction unit comprising:

means for receiving color component values from the image reading unit;

memory means for storing information regarding a relationship between the overall spectral characteristics of the independent image reading unit and reference spectral characteristics for a plurality of colors; and calculation means for calculating corrected color component values based on the stored information so that the independent image reading unit exhibits substantially the same overall spectral characteristics as each of the other of the plurality of image reading units.

* * * * *